Dec. 10, 1957 W. R. BRYANT 2,815,537
PROCESS AND APPARATUS FOR CONTROLLING THE
MOISTURE CONTENT OF SEED COTTON
Filed Feb. 25, 1955 5 Sheets-Sheet 2

William R. Bryant
INVENTOR.

BY
Attorneys

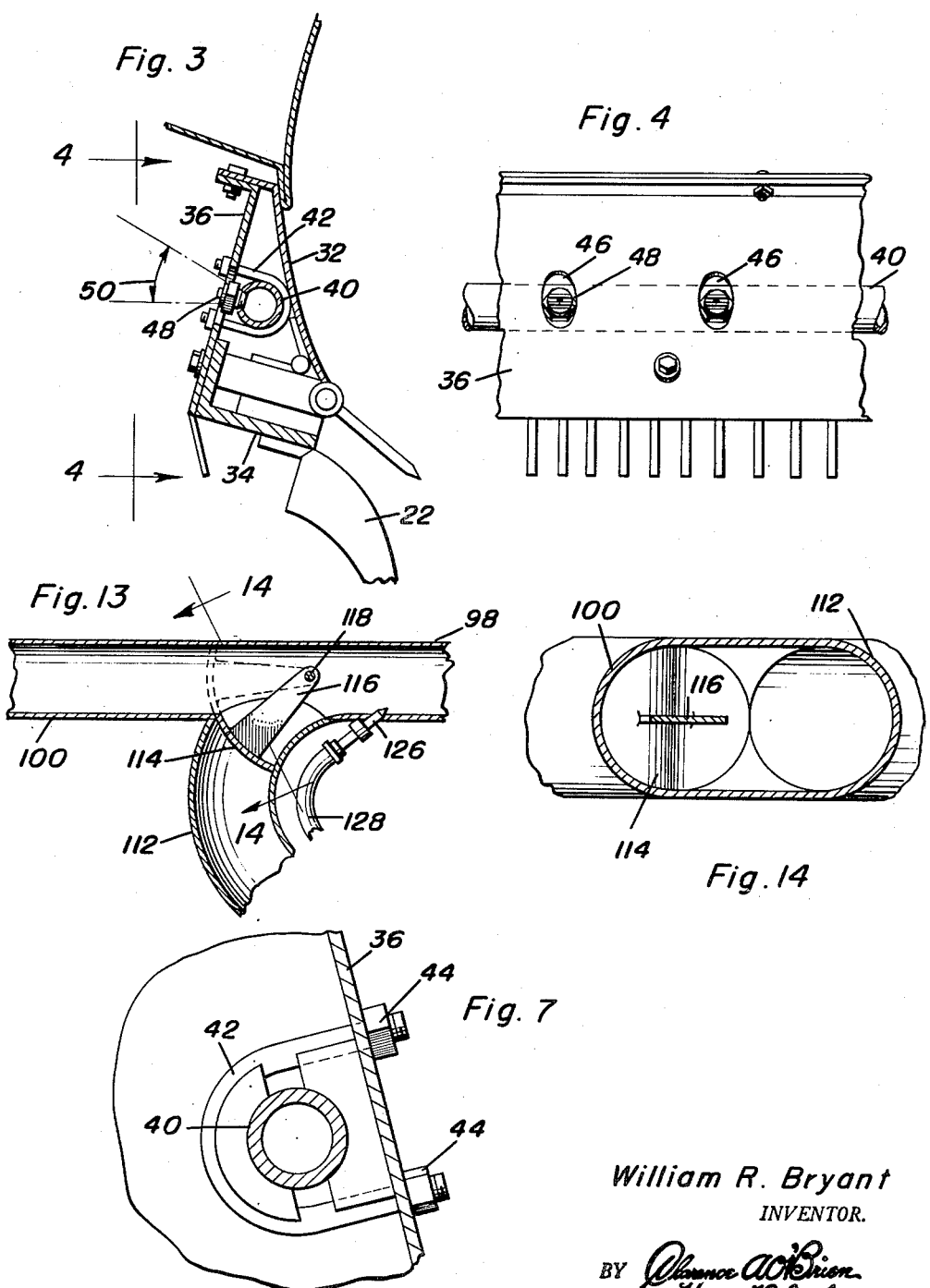

Dec. 10, 1957 W. R. BRYANT 2,815,537
PROCESS AND APPARATUS FOR CONTROLLING THE
MOISTURE CONTENT OF SEED COTTON
Filed Feb. 25, 1955 5 Sheets-Sheet 4
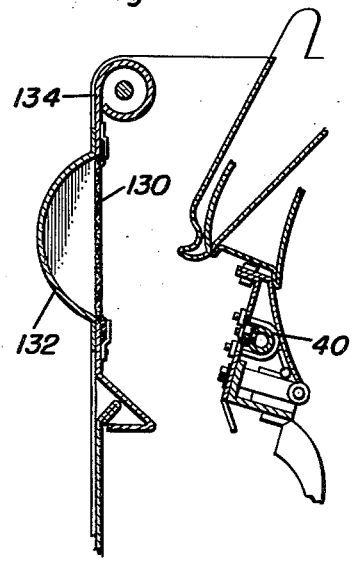
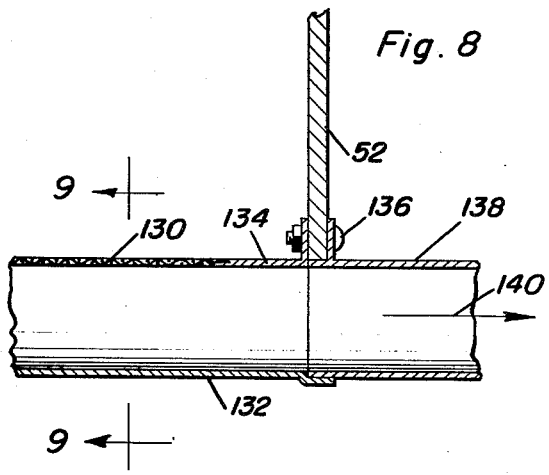
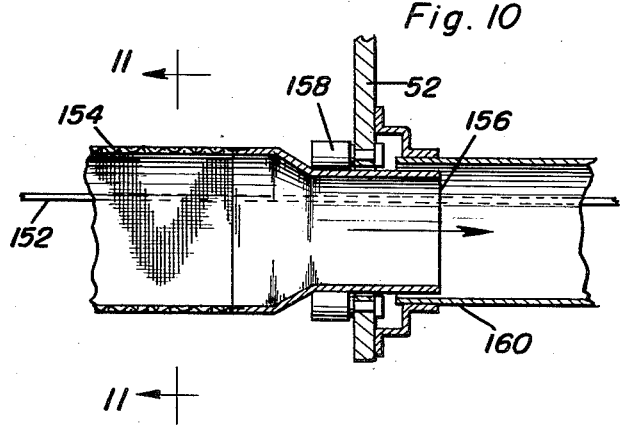
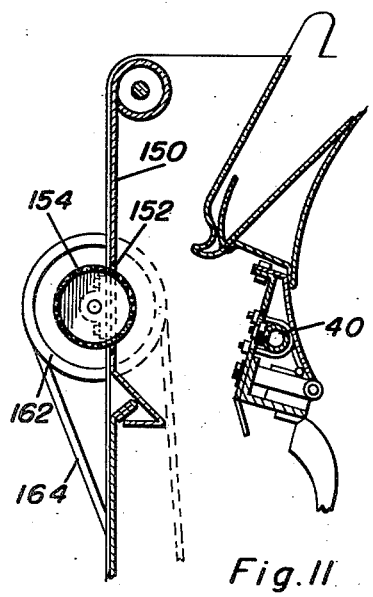
William R. Bryant
INVENTOR.

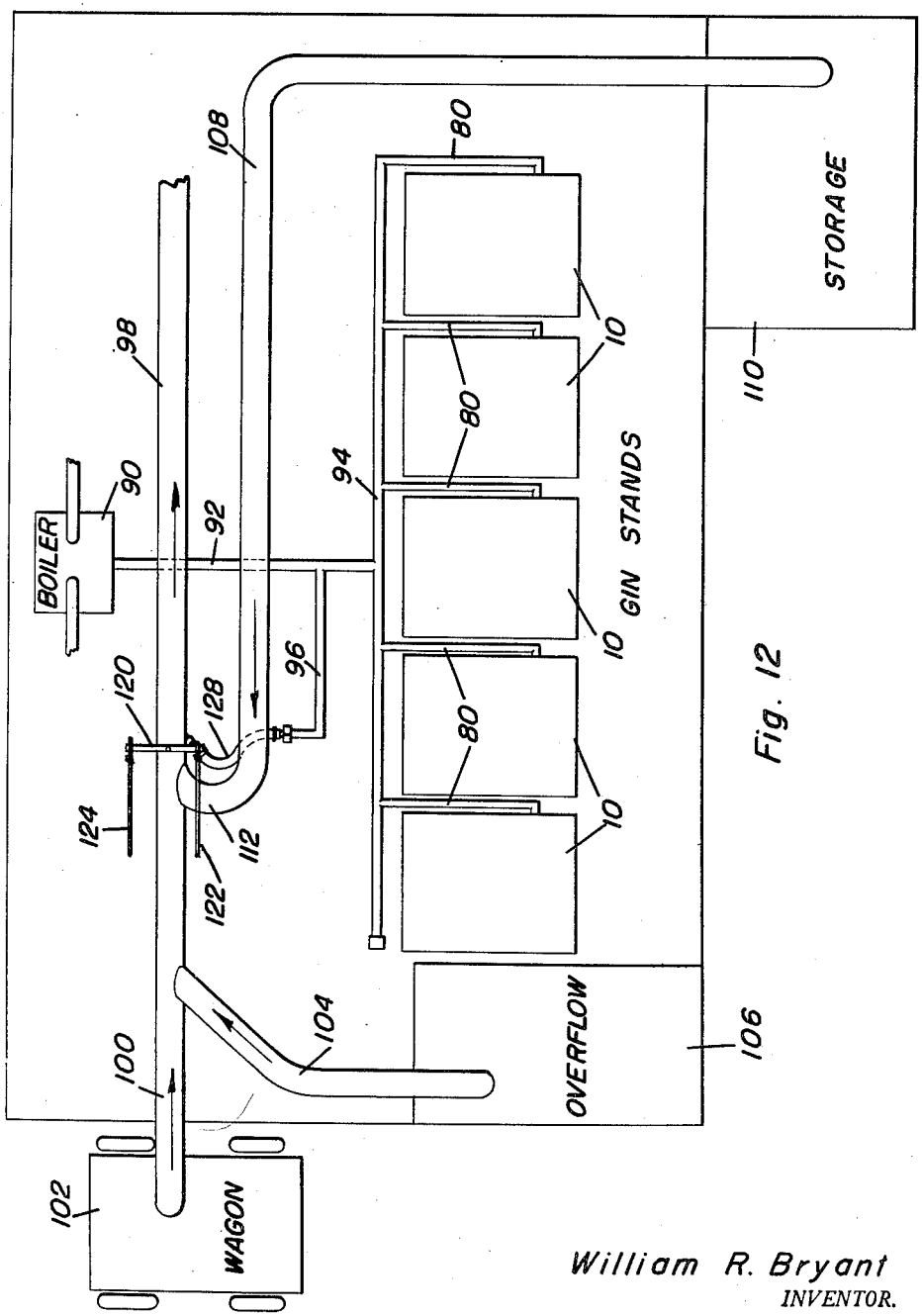

United States Patent Office 2,815,537
Patented Dec. 10, 1957

2,815,537

PROCESS AND APPARATUS FOR CONTROLLING THE MOISTURE CONTENT OF SEED COTTON

William R. Bryant, Jonesboro, Ark.

Application February 25, 1955, Serial No. 490,459

25 Claims. (Cl. 19—66)

This invention comprises novel and useful improvements in a process and apparatus for controlling the moisture content of seed cotton, and more specifically has as its general object the provision of a method and an apparatus whereby moisture may be effectively introduced into seed cotton for imparting a controlled moisture content thereto during the ginning operation in a gin stand and prior to the passage of the seed cotton through the gin saws.

This application is a continuation-in-part of my prior application Serial No. 414,322, of the same title, filed March 5, 1954 and now abandoned.

This invention is similar in subject matter to that set forth in my copending application, Serial No. 467,813, filed November 9, 1954 for Process and Apparatus for Controlling the Moisture Content of Lint Cotton, and which in turn is a continuation-in-part of my prior, also copending application of the same title, Serial No. 410,553, filed February 16, 1954 and now abandoned. In these copending applications, a process and apparatus are disclosed whereby a controlled moisture content could be effected for lint cotton after the same had been passed through the gin stands, by introducing the moisture into the lint cotton in the lint condenser. In the present application, however, a process and apparatus is provided whereby additional moisture may be introduced into the cotton fibers after the heating and cleaning operation of the same has been completed in the conventional driers and cleaners of a cotton gin, in order that the optimum moisture content thus produced in the cotton fibers may improve the characteristics of the same and thereby render more efficient and effective the ginning operation and further reduce to a minimum breakage and damage to the cotton fibers by their passage through the gin saws.

It is well understood among those versed in the art of ginning cotton that the moisture content of the seed cotton, as the same arrives at the gin after picking, varies considerably from time to time, even when picked from the same field at different times of the same day. It is further known that seed cotton when delivered to the gin has its fibers accompanied by dirt or trash of various kinds. In its natural state as delivered to the gin, the normal moisture of the cotton fibers renders the same sticky so that they tend to cling to the bits of trash with which they are intermingled.

In order to effectively remove such trash and foreign matter from the cotton fibers and thus prepare the latter for passage through the gin saws for separating the fibers from the seeds, it is necessary to remove moisture from the cotton fibers or dry the same in order that they may be more readily separated from the trash and entrained foreign matter. For that purpose, the gin is provided with an extensive system for heating and drying the cotton. Since the seed cotton delivered to the gin will vary widely in its moisture content from time to time, and since it is very difficult to control the exact amount of drying of the cotton and it is impractical to attempt to retain a predetermined minimum moisture content in the cotton fibers, by this drying operation, the fibers are usually considerably overdried.

When cotton fibers having an insufficient moisture content, such as the above mentioned overdried cotton fibers, are passed through the gin saws, they frequently suffer damage and deterioration in quality and value since the overdried fibers are usually brittle and easily broken. On the other hand, it is well known that fibers having a predetermined optimum moisture content possess the maximum characteristics of elasticity and resiliency, pass through the gin saws with a minimum of breakage or damage, and command the highest market price.

It is also known that if fibers having an excess of moisture are passed through the gin saws, they tend to adhere to the saws, interfering with and even stopping the ginning operation. It is therefore evident that the treating of the seed cotton to impart thereto a predetermined optimum moisture content and one which can be controlled within rather precise limits would result in the maximum efficiency of operation of the gin, and would produce a lint cotton of maximum value.

It is therefore the primary purpose of this invention to provide a process and an apparatus whereby the seed cotton may be treated to impart thereto a controlled moisture content after the seed cotton has been cleaned and immediately prior to its passage through the gin saws.

A further object of the invention is to provide an apparatus and process whereby additional moisture may be most efficiently and effectively introduced into the seed cotton immediately prior to its passage through the gin saws.

It is also known that the passage of the seed cotton fibers through the driers and cleaners of a cotton gin give rise to the formation of static charges upon the cotton fibers, which in view of the dry condition of the same are prevented from escape, and which static charges seriously and detrimentally affect the passage of the fibers through the gin stand and subsequently through the line flue and the lint condenser. Further, the presence of the extremely dry cotton fibers in the equipment of the cotton gin is a constant fire hazard in the gin stand, in which fires are very difficult to detect and are frequently transmitted by the lint through the line flues into the lint condenser and subsequently into the bales of ginned cotton.

It is therefore a further important object of the invention to provide a process and an apparatus whereby static charges upon the seed cotton may be effectively eliminated in the gin stand and especially prior to the passage of the seed cotton through the gin saws; and wherein the danger of fires originating in the gin stand may be substantially if not entirely eliminated; and wherein any fire originating therein may be quickly extinguished.

Yet another very important object of the invention is to effect a process and apparatus wherein the objects of the immediately preceding paragraph may be realized in conjunction with the objects hereinbefore set forth.

Another very important object of the invention is to provide an apparatus and process wherein controlled quantities of moisture may be readily and effectively introduced into and homogeneously mixed with the seed cotton fibers during their passage through the suction supply conduit prior to their introduction into the driers; and into the gin stand prior to passage of the seed cotton through the gin saws.

A still further important object of the invention is to provide an apparatus and method wherein the introduction of moisture into the seed cotton may be very accurately controlled; may be so introduced as to ensure a homogeneous mixture of the moisture throughout all of the fibers of the seed cotton; and wherein the moisture shall be so introduced that it may be assisted and aided by the natural air circulation within the gin stand.

As a result of extensive tests, I have definitely ascertained that it is impossible to obtain a desired additional increase in the moisture content of the cotton fibers by applying to those fibers the precise quantity of moisture by which it is desired to increase the moisture content. While the reason for this phenomenon is not definitely understood, it is believed to be a result of the relatively short period of time available for introducing moisture into the fibers during their passage through the various elements of a cotton ginning plant. This phenomenon has been proven to hold true for the introduction of moisture at any of the various stages and apparatuses in the handling and treating of the cotton during its passage through a cotton ginning plant.

It has been definitely shown by exhaustive tests that it particularly holds true for the introduction of moisture into the seed cotton during its passage through the gin stand.

It is a fundamental and important principle of this invention that the difficulties presented by the above mentioned phenomenon may be satisfactorily overcome by the subjecting of the cotton fibers in the various stages of their treatment by the apparatuses of a cotton ginning plant, to a substantial excess of additional moisture over that which it is desired to introduce into the cotton fibers, and a subsequent removal of the excess moisture which is not absorbed by the fibers or which it is not desired to be introduced into the fibers. It is believed that the provision of an excess of moisture to some extent, at least, compensates for the shortness of time available for absorption of moisture by the cotton fibers, whereby the rate of absorption or of adherence of the moisture to the fibers will be greatly increased, whereby the desired quantity of additional moisture may be absorbed by and adhered to the fibers in a quantity sufficient to produce the desired increase in the moisture content of the fibers.

It is therefore a further prime object of this invention to provide a process and apparatus whereby cotton fibers having a moisture content below their optimum moisture content may be brought to a desired optimum moisture content by subjecting the fibers to additional moisture in excess of that which it is desired to introduce into the fibers, and thereafter removing the excess moisture over that which it is desired to introduce into the fibers.

A further important and corollary object of the invention is to provide an apparatus and process whereby the excess moisture which it is not desired to be introduced into the cotton from the surplus of moisture supplied thereto may be removed in a readily controllable manner by the natural air blast or draft of the gin stand.

A further very important object of the invention is to provide an apparatus and process whereby the additional moisture to be introduced into the seed cotton in the gin stand may be introduced at a location where the cotton is passing in a relatively thin stream and whereby the cotton may be homogeneously treated with moisture during such passage; and whereby the natural flow of cotton through the gin stand will be in no way impaired or adversely affected by the application of moisture thereto.

Another extremely important object of the invention is to provide an apparatus and method whereby any excess moisture introduced into the seed cotton may be readily and effectively removed therefrom.

Yet another important object of the invention is to provide a process and apparatus whereby moisture may be introduced into the seed cotton in a gin stand with a minimum alteration of the structure of the latter.

A still further specific object of the invention is to provide a process and apparatus whereby a plurality of streams of moisture may be effectively introduced into the seed cotton passing from the cleaners into the gin stand; and wherein the streams of moisture so introduced may be varied as to their angle of impingement upon the seed cotton and as to their distance from the seed cotton for thereby controlling the extent of moisture absorption by the seed cotton.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a vertical transverse sectional detail view taken upon an enlarged scale substantially upon the plane indicated by the section line 3—3 of Figure 1 and showing more specifically one manner in which the moisture introducing means in accordance with this invention is associated with and incorporated within conventional structure of a gin stand;

Figure 4 is a fragmentary elevational view taken substantially upon the plane indicated by the section line 4—4 of Figure 3 and showing the manner of mounting the nozzles of the moisture introducing apparatus in accordance with this invention;

Figure 7 is a vertical transverse sectional detail view taken upon an enlarged scale substantially upon the plane indicated by the section line 7—7 of Figure 6;

Figure 8 is a fragmentary detail view of a modified construction for removing excess moisture from the gin stand;

Figure 9 is a vertical transverse sectional view taken substantially upon the plane indicated by the section line 9—9 of Figure 8;

Figure 10 is a view similar to Figure 8 but showing a modified construction for removing excess moisture from the gin stand;

Figure 11 is a vertical transverse sectional view taken substantially upon the plane indicated by the section line 11—11 of Figure 10;

Figure 12 is a diagrammatic view in plan of a gin showing the manner in which moisture may be simultaneously introduced into the gin stands and into the air suction conduit of the gin, arrows indicating the direction of flow of the air and seed cotton therein;

Figure 13 is a detailed view in vertical section of a portion of the suction conduit and the manner in which the moisture injecting nozzle is located with respect thereto;

Figure 14 is a detail taken substantially upon the plane indicated by the section line 14—14 of Figure 13.

Figure 1:
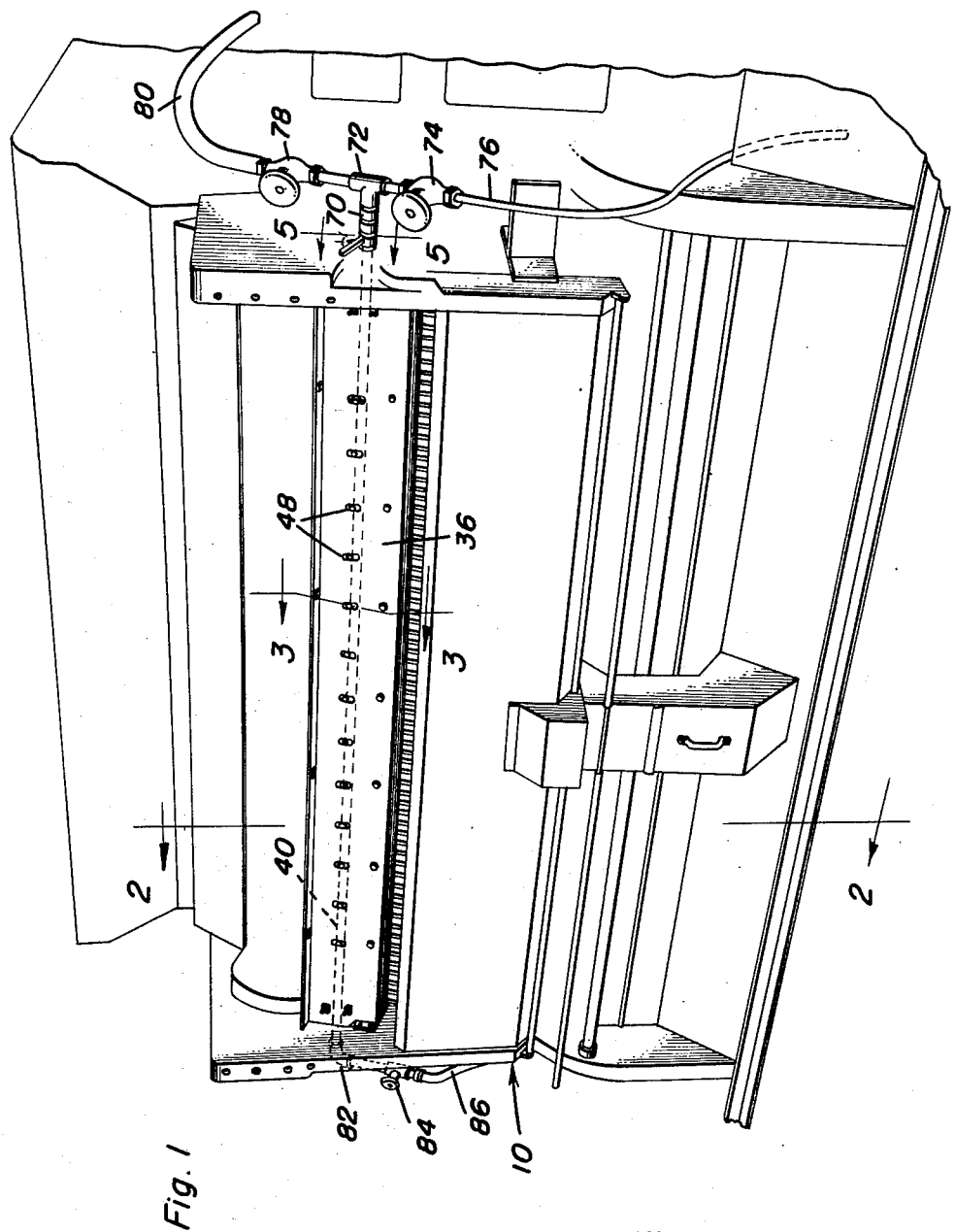
Figure 1 is a perspective view taken from the front of a gin stand to which the process and apparatus forming the subject of this invention have been applied, the upper front panel of the gin stand being removed therefrom.

Throughout this specification, I have used the term "moisture" to designate the treating agent introduced into the cotton by the process and apparatus disclosed herein. It is to be understood that I use this term in its broadest sense, and that the term is intended to denote not only water but any other liquid treating agent. Thus, it is contemplated that water, humidified or moistened air in the form of a mist or spray or fog, steam, refined or unrefined cottonseed oil, special wetting or static eliminating materials or other agents may be introduced. For the sake of consistency in exemplifying the manner in which the principles of the invention may be applied in a method and apparatus, there has been disclosed an apparatus for generating steam or superheated steam as the cotton fiber treating agent. It is to be clearly understood, however, that the principles of this invention are in nowise limited to such a moisture generating apparatus, since the invention is concerned with an apparatus and process for the introduction of moisture and not to any particular method or means for generating or preparing such moisture for introduction.

While moisture may be beneficially introduced into the seed cotton in numerous places in the gin stand, the primary problem is to precisely control the quantity introduced; to introduce the moisture in quantities in excess of the actual amount by which it is desired to increase the moisture content; to remove the surplus moisture effectively; and to avoid interference with the natural rate of flow of the fibers through the gin stand, and I have found that the introduction of the moisture into the throat of the stand and into the seed cotton immediately prior to its passage through the ginning roll produces the optimum results. Since during its passage through the throat of the stand, the seed cotton falls or descends in a relatively thin blanket or curtain across the entire front of the stand, it is thus most effectively disposed for absorbing, and for absorbing in controlled quantities, moisture impinging thereon. In this particular location, the seed cotton falling from the feeder into the gin stand is accompanied by an appreciable air flow or circulation which assists in fluffing or spreading and separating the cotton fibers, and in causing moisture introduced at this location to be homogeneously and effectively intermingled with the cotton fibers. Further, owing to the shape and dimensions of the walls surrounding the seed cotton during its passage through this portion of the gin stand, a much more precise regulation and control of the quantity of the moisture introduced, the force and direction of its impingement upon the seed cotton, and the removal of excess moisture is possible.

The gin stand indicated generally by the numeral 10 includes the usual upper front panel 12 and lower front panel 14, the usual roll box 16, upper and lower picker rolls 18 and 20, respectively, the huller ribs 22, the ginning ribs 24 and the gin saws 26. Also indicated at 28 is the inlet by which seed cotton passing from the feeder drops into the throat 30 of the gin stand on its way to the upper picker roll 18.

Figure 2:
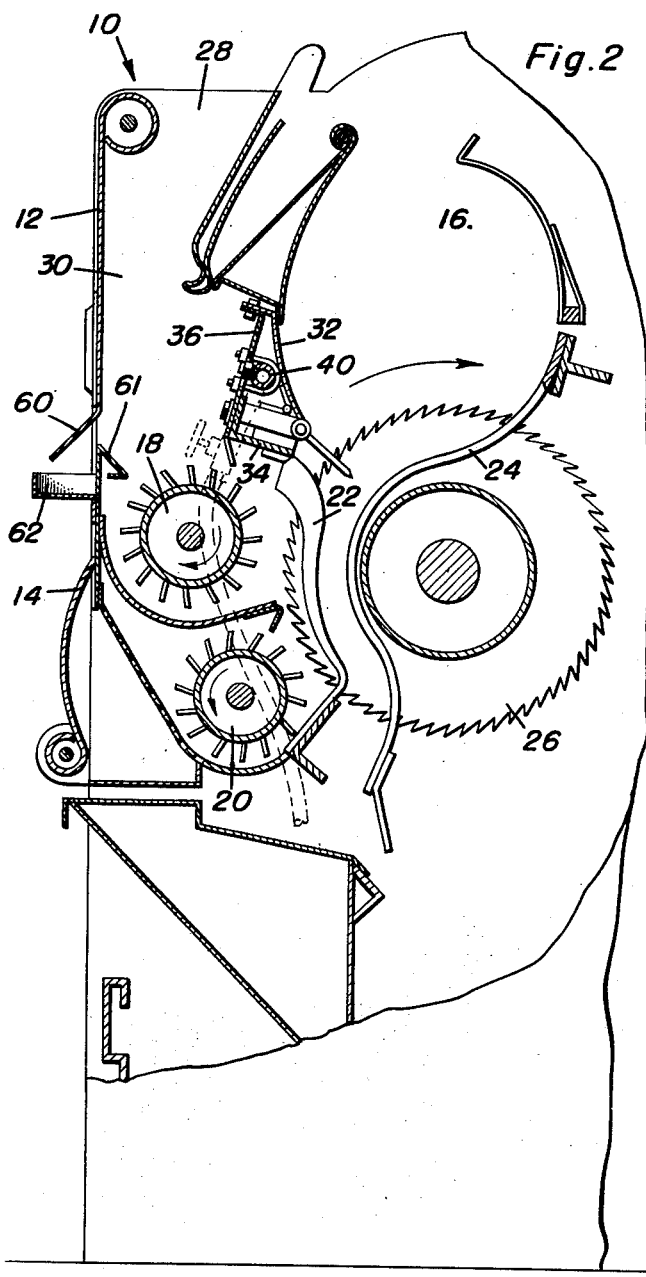
Figure 2 is a vertical transverse sectional view taken upon an enlarged scale substantially upon the plane indicated by the section line 2—2 of Figure 1 and showing certain of the internal construction of the front portion of a gin stand and one of the manners in which the present invention is applied thereto.
Figure 5:
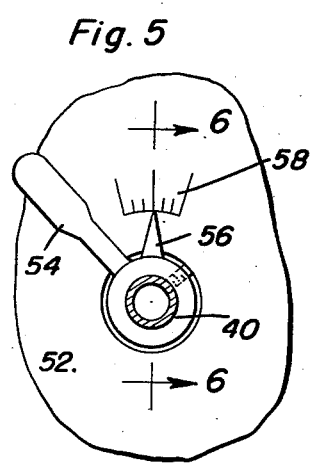
Figure 5 is a vertical transverse sectional view taken substantially upon the plane indicated by the section line 5—5 of Figure 1 and particularly illustrating the manner in which the angular disposition of the spray nozzles may be adjusted together with an indicating device for the same.
Figure 6:
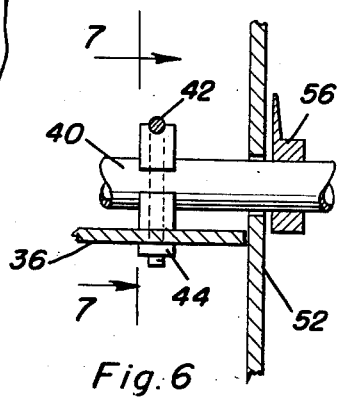
Figure 6 is a vertical longitudinal sectional view taken substantially upon the plane indicated by the section line 6—6 of Figure 5 and illustrating the manner in which the angularly adjustable spray nozzle assembly is mounted.

In a conventional gin, there is a curved semi-cylindrical plate or partition 32 which forms the lower half of the front wall of the roll box. Secured to the lower portion of the front side of the plate 32 is an angle iron bar 34 which serves as a brace for the wall 32 and also constitutes a header for supporting the upper ends of the huller ribs 22. A further plate 36 is connected to the upper portion of the plate 32 and to the angle iron member 34, constituting a filler shield and which further serves as a brace for the upper portion of the wall 32. There is thus a triangular space formed between the members 32, 34 and 36 in a conventional gin which is utilized in a preferred embodiment in accordance with this invention to house the moisture introducing means in a manner wherein the latter is protected and does not obstruct the normal flow of cotton through the gin stand. The above referred to construction is shown in Figures 2 and 3.

The moisture introducing means may conveniently comprise a header or pipe 40 which is disposed within the triangular space between the members 32, 34 and 36, and extends through the opposite end walls of the gin stand. The header is secured to the inside surface of the plate 36 adjacent the ends thereof as by means of a pair of U-bolts 42 which surround the header and extend through suitable apertures drilled in the plate 36, being removably secured thereto as by nuts 44.

Along its length, the plate 36 is provided with a plurality of vertically elongated slots or apertures 46, see in particular Figure 4, and the header is provided with a plurality of metering spray nozzles 48 of any desired or conventional type, each of which is disposed immediately behind or in one of the apertures 46. The arrangement is such that by a slight rotation of the header 40 about its horizontal axis, the nozzles 48 may be given a limited vertical angular adjustment, as for example, through the angle indicated by the arrow 50 in Figure 3. In order to effect this adjustment, the U-bolts are loosened sufficiently to permit the header to be rotated, and are then clamped in the readjusted position.

In order to facilitate and to accurately control the angular adjustment of the nozzles, the header 40 where it extends through the end wall 52 of the gin stand is preferably provided with a handle 54 whereby the header may be rotated, and with a pointer 56 which is adapted to cooperate with a scale or indicia 58 upon the end wall 52 whereby the precise angular adjustment given to the header and its nozzles may be determined.

As will be evident from Figure 2, the plurality of spray nozzles carried by the header are positioned to direct their spray across the throat 30 and the spray will, after penetrating the falling stream of cotton, eventually impinge upon the upper front panel 12 upon the inside surface of the same. The excess moisture over that absorbed by the cotton, and which may condense upon, collect upon or run down the inside surface of the upper front panel 12, will drop from a depending outturned apron or lip 60, disposed above the deflector 61, and which is formed by providing a longitudinal slot extending across substantially the full length of the upper panel 12 and bending this lip outward as shown in Figure 2, and will collect in a trough 62 which may be welded or otherwise mounted upon the upper exterior surface of the lower front panel 14. The surplus in the excess moisture supplied is carried off by the air blast or flow through the gin stand.

It will now be observed that the seed cotton passing through the throat 30 in a thin sheet, will pass through the spray or stream from the nozzles 48, whereby the falling seed cotton will be thoroughly moistened. Obviously, any desired number of nozzles and any desired spacing of the same along the header may be provided to ensure adequate and uniform moistening of the seed cotton. Although but a single row of nozzles has been illustrated upon the header, it is evident that I may employ a plurality of rows of such nozzles, each row being positioned at a different angular arrangement in order to vary the area of the seed cotton which is subjected to the spraying action. Still further, it is possible that I may employ a plurality of headers and nozzles either each separately adjustable or jointly rotatably adjusted by suitable interconnections.

It is also evident that by varying the pressure applied to the nozzles, that the force with which the streams or sprays impinge upon the seed cotton and consequently the extent to which these sprays penetrate the thin, falling layer of seed cotton may be readily adjusted and regulated to thereby further control the quantity of moisture introduced into and absorbed by the seed cotton fibers.

Alternatively, or in conjunction with varying the pressure, the invention includes in its scope the provision of means to vary the distance of the nozzles from the cotton, if desired. Since this last possibility is usually unnecessary, and is not essential to an understanding of the fundamental principles of the invention, it has not been deemed necessary to illustrate the same in the drawings.

It should be further noted that this particular positioning of the moisture introducing means is of further importance in that the moisture is introduced into the current of air inducted into the gin stand with the incoming seed cotton, which current of air assists in admixing the moisture throughout the loose mass of cotton fibers. Moreover, at this point, the picker rolls through their operation introduce a further current of air and the operation of the gin saws 26 still further augment this circulation of air by drawing the same into the roll box. This air current also introduces some of the moisture into the seed cotton in the roll box, further continuing the homogeneous and effective moistening of the entire mass of cotton fibers.

It is contemplated that an excess of moisture introduced will be moved through the gin stand and educted therefrom in the normal air circulation through the same; and will be collected upon the lip 60 and discharge into the collection trough 62.

The moisture removed from the gin stand by the normal air discharge through the lint flue with the lint fibers is further beneficial in that it prevents any subsequent build-up of static charges, acts as a preventive or extinguisher of fires, and also beneficially affects after cleaning where lint cleaners, such as that of Patent No. 2,669,755, are interposed between the gin stand and the lint condenser.

It is within the scope of this invention to introduce the moisture, and by this term I include also any other cotton treating agent, into the header in any suitable form such as water, humidified or moistened air or steam. One satisfactory means for introducing the moisture and controlling such introduction is illustrated in Figure 1. As shown therein, one end of the header has a coupling union of the slip coupling type, indicated by the numeral 70, whereby the rotatable header is placed in communication with a T-coupling 72. The latter is connected through a manually operable valve 74 with a drain or discharge line 76 whose lower end preferably extends into the trough of the trash auger or trash disposal system forming a part of a conventional cotton gin. The other end of the T-coupling 72 is connected through a manually operable valve 78 to a flexible hose 80 by which the moisture may be supplied from any source, such as that set forth hereinafter. At its other end, the header 40 is connected with a suitable slip connection to a fitting 82 which through a manually operable valve 84 is in communication with a drain pipe 86 which may likewise discharge into the trash auger.

The valves 84 and 74 provide a means whereby the header may be bled to ensure that no condensate will be present and that a uniform flow and quality of the moisture or other treating agent will be supplied to the header when the apparatus is placed in operation.

The method and apparatus for introducing moisture by the header assembly 40, and the manner of mounting the latter as shown in Figures 2 and 3 represent merely one of several possible manners of practicing the principles of this invention. Obviously, other embodiments are practical.

Thus, in some instances, it may be desirable to mount the header and spray nozzle assembly 40, 48 upon the exterior surface of the removable upper front panel 12. By providing vertically elongated apertures in such panel, similar to the apertures 46 of the plate 36, it is possible to adjustably direct the spray from the nozzles 48 through the falling seed cotton and through the huller ribs 22 and into the seed roll and the saws. This arrangement may be used either as a substitute for that shown in Figures 2 and 3 or as a supplement thereto. When used as a supplement, the force of the spray from the nozzles carried by the panel 12 may be less than that from the nozzle assembly of Figures 2 and 3 to merely ensure moistening that surface of the falling seed cotton which is adjacent to the plate 12.

Further, in some instances, it may be found effective to remove the upper picker rolls 18 and to mount the header and nozzle assembly in that space, directing the spray through the seed cotton and towards and/or into the saw and seed roll box.

It is a further purview of this invention to not only supply moisture into the gin stands but also to supply moisture into the suction ducts of the gin plant. An example of a satisfactory arrangement for this purpose is diagrammatically indicated in Figure 12, wherein the numeral 10 designates the various gin stands, 90 designates a boiler for generating steam which is delivered by a conduit 92 to a main 94 from which the flexible conduits 80 are supplied. A branch pipe 96 communicated with the pipe 92 delivers the steam into the suction supply lines in a manner to be now set forth.

The gin includes the usual suction supply line 98 which delivers the seed cotton in the direction indicated by the arrow therein, into the drier, extractor and cleaner apparatus of the gin. The suction duct 98 has a suction unloader 100 which extends outside the gin building and is used for removing seed cotton from a conveyance 102 by which the cotton is delivered from the field to the gin. Intersecting the duct 100 is an overflow supply duct 104 which is employed to feed cotton into the suction duct 98 from an overflow pipe 106 to thereby ensure a continuous supply of seed cotton into the gin during those periods when the duct 100 is not in operation. A still further supply duct 108 is used to withdraw cotton from a cotton storage supply 110 which is usually housed outside of the gin building, and to deliver this into the duct 98 through a curved connection with the latter, as at 112.

Referring now more particularly to Figures 13 and 14, it will be seen that the junction of the curved portion 112 with the duct 98 is under the control of a valve member 114 which may be selectively moved between the dotted line position which closes the connection of the duct 98 with the inlet ducts 100 and 104, and opens the duct 98 to the storage supply through the curved portion 112 and the duct 108; or to the full line position shown in Figure 13 when the storage duct 108 is closed and the ducts 100 or 104 are placed in communication with the suction duct 98. It is, of course, understood that a similar or other suitable manually operable selector or control valve is placed at the juncture between the ducts 100 and 104 whereby these conduits may be selectively and alternately placed in operation.

The control valve 114 consists of a dish-shaped circular plate which is provided with an arm 116 having a transverse fulcrum or pivot 118. The fulcrum pin 118, rigidly connected to the arm 116, is provided with a suitable actuating arm 120, see Figure 12, to which may be connected control cables 122 and 124 whereby the valve 114 may be remotely controlled.

As shown in Figure 13, there is provided a spray nozzle 126 which extends into the duct 98 on the downstream side from the valve 114 and which is inclined at such an angle that the stream therefrom will enter the duct in the direction of the air flow and at a point which is below the axis of the incoming streams of air and cotton from either the duct 100 or the duct 112. In this manner, the centers of those streams will pass over and above the nozzle 126 and thus produce an inspirating effect upon the same which will assist in drawing the spray from the nozzle into the stream of air and seed cotton to facilitate a homogeneous admixture of the spray with the cotton fibers. The nozzle 126 is supplied with steam from the pipe 96 through a flexible conduit 128, as shown in Figure 12.

It will thus be seen that the same source of supply of treating agent, this being illustrated as steam in the apparatus disclosed in the drawings, but which could likewise be any suitable treating agent from any desired source, will thus simultaneously treat the seed cotton as the latter enters the drier of the cotton gin to thus eliminate static and prevent the possibility of fires in the cotton; and will also improve the characteristics and especially the fiber resiliency of the seed cotton after the latter has passed through the cleaner and is entering the gin stand for passage through the gin saws.

In the embodiment described hereinbefore, excess moisture was removed from the gin stand either with the air circulated through the gin stand or through the drip plate 60 and collection trough 62. It is contemplated, however, that a more positive and effective removal of the surplus moisture is possible through a modified construction shown in Figures 8 and 9. In this form, the upper front panel 12 of the gin stand is removed and is replaced by a screen 130. Consequently, any moisture or condensate from the spray nozzles which impinge upon this screen is free to pass through the same. A semi-cylindrical casing or cover plate 132 is secured to the outside wall of the replacement panel 134 and a source of suction is applied to the casing to assist in withdrawing moisture through the screen 130 into the casing and removing the same from the gin stand. As will be apparent in Figure 8, the replacement panel including the screen 130 is secured to the end walls 52 of the gin stand, as by bolts 136.

The aligned ends of the series of casings 132 for the series of gin stands are connected by suitable conduits or connectors 138 whereby a single source of suction may be sufficient to exhaust the moisture from the entire series of aligned casings 132, in the direction of the arrow 140. Thus, surplus moisture may be removed by the positive action of a source of suction.

In place of the stationary moisture educting screen of Figures 8 and 9, I may also utilize a rotating pipe or moisture removing screen shown in Figures 10 and 11. In this embodiment, the conventional upper front panel of the gin stand is replaced by an upper panel 150 which has a longitudinal slot 152 extending across all or any desired part of the length of the same. A cylindrical screen 154 is rotatably mounted in the gin stand with substantially one-third of its circumference disposed within the gin stand and two-thirds disposed outwardly thereof, as illustrated in Figure 11. This screen may conveniently include diametrically reduced tubular end members 156 by which the screen is rotatably mounted in suitable supporting roller bearings 158 in the end walls 52 of the gin stand. A series of such screens may be placed in communication with each other through the coupling sleeves 160 so that in effect, the aligned screens of a series of gin stands will form a continuous rotating screen.

Rotation may be imparted to the individual screens 154 in any desired manner as, for example, by a pulley 162 secured to one end of the screen and connected as by a belt 164 with any of the various driving pulleys with which a gin stand is customarily provided. Alternatively, all of the aligned sleeves may be directly connected together for rotation from a common driving means.

The rotating moisture educting screen has the advantage that by its rotation, there is maintained a clean screening surface for withdrawing moisture from the gin stand, thereby minimizing the obstruction of moisture educting screen surface by the collection of cotton fibers thereon.

It is also within the scope of this invention to omit the suction means applied to the conduits 138 or 160 and allow the casings 132 or the screen 154 to communicate, singly or in a connected series, with the atmosphere.

In the embodiments of Figures 8, 9 and Figures 10, 11, it is, of course, understood that the previously described apparatus for controlled introduction of moisture and the previously disclosed methods for the same may be employed.

As hereinbefore set forth, the moistening of the seed cotton to effect an optimum moisture content facilitates the movement of the cotton through the gin stand and other equipment by dissipating static which causes the cotton to cling to metallic surfaces; and increases the resilience and elasticity of the fiber, improving the effectiveness of the ginning and the quality of the lint produced. It has been established by tests that an addition of 1% to 2% to the moisture content of very dry seed cotton in the gin stand, in accordance with this invention, has increased the rate of ginning from 25% to 30%.

When static charges in the fibers of seed cotton have been dissipated, it has been found that the normal moting process, the discharge of foreign matter from the stream of lint cotton, is greatly increased in its efficiency.

In the foregoing description, there have been disclosed apparatuses and methods whereby a desired total moisture content might be obtained in cotton fibers during their passage through a gin stand by first introducing to the fibers an excess of moisture over that which it is desired to add to the moisture content of the fibers; and subsequently removing the excess of the moisture introduced by means of the air flow through the gin stand, by suction, by condensation, or by combinations of these. The primary control means for varying the quantity of moisture to be introduced into the cotton fiber, however, was secured through a control of the quantity of moisture introduced into the gin stand.

It is however possible, for the purposes of regulating the additional moisture absorbed into and retained by the cotton fibers, to control the quantity of such additional moisture introduced through a regulation of the quantity of moisture which is removed by the air flow through the gin stand. Thus, in some instances, it may be preferred to secure the desired final resultant moisture content by controlling the quantity of moisture removed by the air flow either as a supplement to or as a substitute for the control of the quantity of the moisture introduced into the gin stand. This alternative method of regulating the quantity of moisture permitted to be introduced into the cotton fibers may be secured by controllably varying the capacity of the air flow to absorb and remove moisture from the gin stand.

A practical means for effecting this result can be obtained by preconditioning the air stream passing into the throat of the gin stand and/or the blast air supplied to the gin stand by varying the temperature of this air and/or its humidity. Thus, the mere warming of this air will increase its ability to absorb and carry away moisture, and thus will lower the amount of moisture available for introduction into the cotton fibers. Similarly, lowering the humidity of this air will likewise increase its capacity to absorb and remove excess moisture and thus reduce the quantity of moisture available for absorption by the cotton fibers.

Since any suitable mechanism of a conventional and known type can be provided for regulating the temperature and humidity of the air, an illustration and description of the precise constructions of such mechanisms is deemed to be unnecessary for an understanding of this invention.

The present invention therefore includes within its concept the essential feature of introducing a surplus of moisture over that which it is desired to be absorbed by the cotton fibers, removing the excess of moisture in various ways, and controlling the quantity to be absorbed through a control of the surplus originally introduced into the gin stand and/or the proportion of the moisture which is removed as excess moisture by the air flow through the stand or by other means.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A process for moistening seed cotton during its passage through a gin stand which comprises moving the seed cotton in a thin free falling sheet of discrete masses of seed cotton within the gin stand, directing a plurality of streams of moisture upon said sheet and across substantially the entire width of the same for homogeneously moistening the seed cotton.

2. A process for moistening seed cotton during its passage through a gin stand which comprises moving the seed cotton in a thin free falling sheet of discrete masses of seed cotton within the gin stand while accompanying the seed cotton with an air flow, directing a plurality of streams of moisture through said air flow and upon said sheet across substantially the entire width of the same for homogeneously moistening the seed cotton, varying the length of travel of said streams through said air flow prior to impingement of the streams upon said sheet of seed cotton.

3. The process of claim 1 including the step of varying the pressure of the streams and thereby the extent of their penetration of the sheet of seed cotton.

4. The process of claim 1 including the step of collecting excess moisture from the streams not absorbed by the sheet of seed cotton and educting the same from the gin stand.

5. A moistening attachment for a gin stand having saws and a throat for receiving seed cotton comprising means for projecting moisture onto seed cotton during its passage through the gin stand, means for mounting said moisture projecting means in the gin stand in such a position at the lower portion of said throat as to project moisture across the throat upon the seed cotton prior to its passage through the gin saws.

6. A moistening attachment for a gin stand of the type having gin saws, a roll box with a front wall, huller ribs and a filler plate comprising, means for applying moisture to seed cotton during its passage through a gin stand, means for mounting said moisture applying means in a gin stand in a position for moistening the seed cotton prior to its treatment by the gin saws, said moisture applying means including a header extending longitudinally of a gin stand, nozzles carried by said header, said mounting means supporting said header between the lower half of the roll box front wall, the huller ribs, header and the filler plate of a gin stand, said filler plate having apertures, said nozzles registering with said apertures.

7. The combination of claim 6 wherein said apertures are elongated, said header being rotatable for vertically adjusting the streams from the nozzles passing through the elongated apertures.

8. A gin stand including gin saws and an inlet for seed cotton, means in said gin stand for introducing moisture into seed cotton during its passage from the inlet to the gin saws, a screen mounted in said gin stand in such position as to effect passage of the seed cotton in close proximity thereto, means for educting surplus moisture from the gin stand through said screen.

9. The combination of claim 8 wherein said last means includes a source of suction, means operatively connecting said source of suction with said screen for drawing moisture therethrough.

10. The combination of claim 8 wherein said last means includes a source of suction, means operatively connecting said source of suction with said screen for drawing moisture therethrough, means for securing said screen in stationary position in a wall of the gin stand.

11. The combination of claim 8 wherein said last means includes a source of suction, means operatively connecting said source of suction with said screen for drawing moisture therethrough, said screen comprising a foraminous cylinder, means mounting said cylinder for rotation in a wall of the gin stand.

12. A process for obtaining a desired percentage by weight moisture content in seed cotton, which has a moisture deficiency, during its passage through a gin stand, which comprises; introducing moisture into the gin stand, accompanying said seed cotton with an air stream, continuously applying to the seed cotton and the accompanying air during the passage of the same through the gin stand and before treatment of the cotton by the gin saws a surplus of moisture over that which would produce the desired percentage, and thereafter continuously removing air laden with excess moisture from the gin stand, controlling the relative quantities of surplus moisture introduced and of excess moisture removed to thereby leave the desired percentage by weight moisture content in the seed cotton.

13. A process for obtaining a desired percentage by weight moisture content in seed cotton, having a moisture deficiency, during its passage towards the gin saws of a gin stand, which comprises; accompanying said seed cotton with an air stream, continuously applying to the seed cotton and the accompanying air during its passage towards but prior to the treatment of said cotton by the gin saws a surplus of moisture over that which would produce the said desired percentage, and thereafter continuously removing air laden with excess moisture from the seed cotton during said passage, controlling the relative quantities of surplus moisture applied and of excess moisture removed to thereby leave the desired percentage by weight moisture content in the seed cotton.

14. The process of claim 13 wherein the step of controlling the quantity of surplus moisture applied is effected by varying the pressure at which the surplus moisture is applied.

15. The process of claim 13 wherein the step of controlling the quantity of excess moisture removed is effected by passing moisture absorbing air in contact with the seed cotton and with the surplus moisture.

16. The process of claim 13 wherein the step of controlling the quantity of excess moisture removed is effected by passing moisture absorbing air in contact with the seed cotton and with the surplus moisture, and varying the capacity of said air to absorb moisture.

17. A process for obtaining a desired percentage by weight moisture content in seed cotton, which has a moisture deficiency, during its passage through a gin stand, which comprises; introducing moisture into the gin stand continuously applying to the seed cotton during the passage of the latter through the gin stand and before its treatment by the gin saws a surplus of moisture over that which would produce the said desired percentage, and thereafter continuously removing excess moisture from the gin stand, controlling the quantities of surplus moisture introduced and of excess moisture removed to thereby leave the desired percentage by weight moisture content in the seed cotton, the surplus of moisture being applied to the seed cotton during its passage through the throat of the gin stand.

18. The process of claim 12 wherein the excess of the surplus moisture is removed by the air draft through the gin stand.

19. A process for obtaining a desired percentage by weight moisture content in seed cotton, which has a moisture deficiency, during its passage through a gin stand, which comprises; introducing moisture into the gin stand continuously applying to the seed cotton during the passage of the latter through the gin stand and before its treatment by the gin saws a surplus of moisture over that which would produce the said desired percentage, and thereafter continuously removing excess moisture from the gin stand, controlling the quantities of surplus moisture introduced and of excess moisture removed to thereby leave the desired percentage by weight moisture content in the seed cotton, the surplus of moisture being applied to the seed cotton at least in part during its passage through the throat of the gin stand.

20. The process of claim 12 wherein the excess of the surplus moisture is removed by at least in part the air draft through the gin stand.

21. The process of claim 12 including controlling the quantity of moisture introduced into the seed cotton by varying the quantity of the surplus moisture introduced.

22. The process of claim 12 including controlling the quantity of moisture introduced into the seed cotton by varying the quantity of the excess moisture removed.

23. The process of claim 12, wherein the step of controlling is effected by varying the humidity of the accompanying air to thereby control the capacity of the latter to absorb moisture.

24. The process of claim 12, wherein the step of controlling is effected by varying the temperature of the accompanying air to thereby control the capacity of the latter to absorb moisture.

25. The process of claim 12, wherein the step of controlling is effected by varying the temperature and humidity of the accompanying air to thereby control the capacity of the latter to absorb moisture.

References Cited in the file of this patent

UNITED STATES PATENTS

| Number | Name | Date |
|---|---|---|
| 399,206 | Osborn | Mar. 5, 1889 |
| 700,347 | Lumpkin | May 20, 1902 |
| 747,315 | Brantley | Dec. 15, 1903 |
| 1,105,441 | Lamb | July 28, 1914 |
| 2,019,079 | Herring | Oct. 29, 1935 |
| 2,158,752 | Fowler | May 16, 1939 |
| 2,568,499 | Hood | Sept. 18, 1951 |
| 2,747,234 | Speakes et al. | May 29, 1956 |